May 5, 1959
F. A. SMITH
2,885,244
DETACHABLE MOTOR VEHICLE WHEEL
Filed Sept. 21, 1956
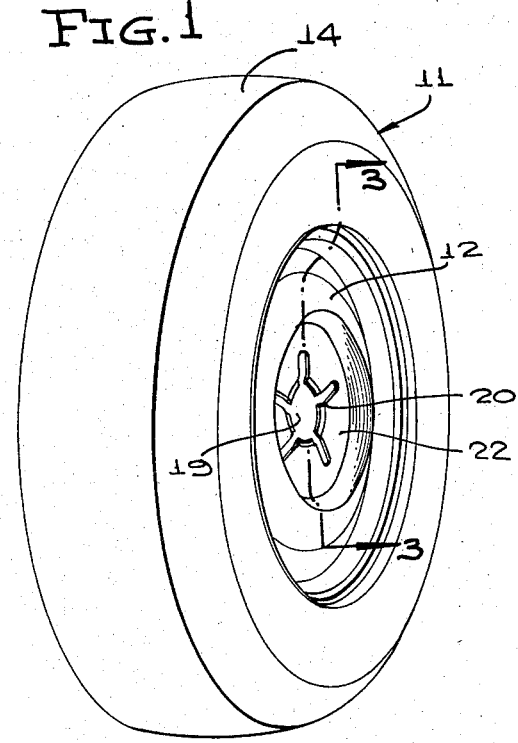
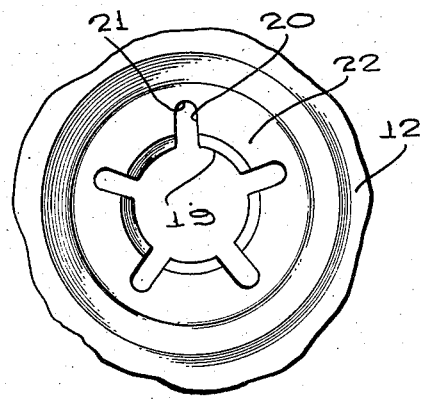
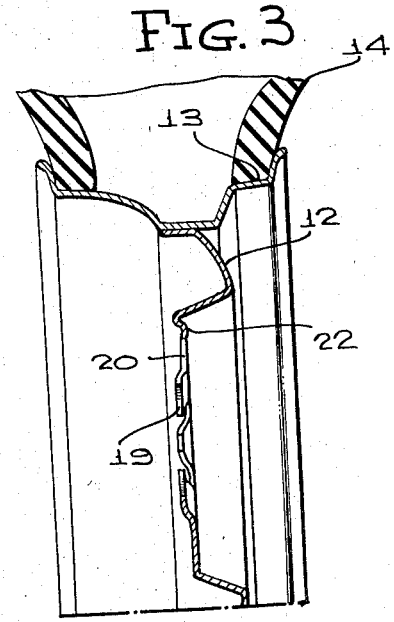
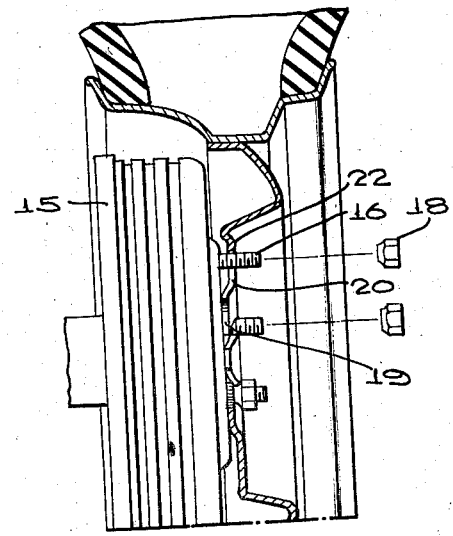
INVENTOR.
FRANK A. SMITH
BY
*McMorrow, Berman & Davidson*
ATTORNEYS

United States Patent Office 2,885,244
Patented May 5, 1959

2,885,244

DETACHABLE MOTOR VEHICLE WHEEL

Frank A. Smith, Niagara Falls, N.Y.

Application September 21, 1956, Serial No. 611,165

1 Claim. (Cl. 301—9)

This invention relates to automobile wheels, and more particularly to an improved wheel adapted to be easily engaged on the studs projecting from the wheel-supporting brake drum, in mounting the wheel.

A main object of the invention is to provide a novel and improved automobile wheel which is arranged so that it is easily engaged on the circularly arranged studs projecting from the brake drum on which the wheel is to be mounted, the wheel being simple in construction, being easy to manufacture, and providing a considerable reduction in the amount of effort required to mount the wheel on the supporting brake drum associated therewith.

A further object of the invention is to provide an improved automobile wheel of the type adapted to be engaged on a plurality of circularly arranged studs projecting from a brake drum associated with the wheel, the improved wheel providing increased visibility of the studs, thereby facilitating the mounting of the wheel thereon, as well as providing means for guiding the wheel onto the studs in proper position for fastening to said studs.

Further objects and advantages of the invention will become apparent from the following description and claim, and from the accompanying drawings, wherein:

Figure 1 is a perspective view of an automobile wheel constructed in accordance with the present invention.

Figure 2 is a fragmentary elevational view of the central portion of the body of the automobile wheel of Figure 1.

Figure 3 is an enlarged transverse vertical cross sectional view taken on the line 3—3 of Figure 1.

Figure 4 is a cross sectional view similar to Figure 3 but showing the manner in which the central portion of the wheel body is engaged on the studs projecting from the associated brake drum.

Referring to the drawings, 11 generally designates a wheel according to this invention. The wheel comprises the generally circular main body 12 formed with the conventional rim 13 on which the vehicle tire 14 is mounted.

As is well known in the art, an automobile wheel is ordinarily mounted on an associated brake drum 15 by means of a plurality of circularly arranged studs 16 provided on the brake drum, the usual wheel having apertures therein which must be registered with the studs 16 when the wheel is being mounted on the brake drum, after which the wheel is fastened to the brake drum by means of nuts 18 engaged on the studs 16. As will be further understood, it is sometimes very difficult to properly register the apertures in the body of the wheel with the studs 16, whereby a considerable amount of time and effort may be required to properly engage the studs in the apertures in the body of the wheel, before the nuts 18 can be fastened on the studs to secure the wheel to the brake drum 15.

In accordance with the present invention, the main body 12 of the wheel is provided with the usual central aperture 19, adapted to receive the wheel hub therethrough, and is further provided with a plurality of evenly spaced radial notches 20 corresponding in number to the number of studs 16 on the associated wheel brake drum 15, and being spaced to receive said studs 16 with the studs engaging the semicircular end portions 21 of the notches 20. The main body 12 is further formed with the flat annular rib 22 containing the semicircular ends 21 of the radial notches 20, whereby the nuts 18 will be located around the annular rib 22 and will bear evenly on said annular rib 22 when tightened.

In mounting the wheel on the associated brake drum 15, it is merely necessary to engage the wheel hub, not shown, through the central aperture 19 of the wheel body 22, and then adjust the wheel so that the studs 16 are received through the respective radial notches 20. During this procedure, the studs may be easily seen, since the notches 20 afford a clear view thereof when the wheel is rotated or otherwise adjusted to bring the studs into registry with the notches. After the studs 16 are engaged in the notches 20, the nuts 18 are engaged on the studs and are tightened, thus securing the wheel to its associated brake drum 15.

While a specific embodiment of an improved motor vehicle wheel structure has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a motor vehicle, a wheel support comprising a brake drum, a plurality of evenly spaced circularly arranged horizontal wheel studs projecting from said brake drum at equal radial distance thereon and rigidly secured thereto, a wheel comprising a generally circular body formed with a substantially circular central aperture and formed with a plurality of evenly spaced radial slots of substantially uniform width and having their outer end portions located to receive said studs, the slots being of a width corresponding to the diameter of the studs, said slots opening into said central aperture at their inner ends, a flat annular rib formed on said circular body concentrically therewith and containing the outer ends of said slots, and respective nuts threaded on said studs and engaging said rib adjacent the outer end portions of said radial slots.

References Cited in the file of this patent

UNITED STATES PATENTS

| | | |
|---|---|---|
| 1,402,029 | Williams | Jan. 3, 1922 |
| 2,130,448 | Signori | Sept. 20, 1938 |
| 2,590,363 | Adair | Mar. 25, 1952 |

FOREIGN PATENTS

| | | |
|---|---|---|
| 855,956 | Germany | July 8, 1949 |
| 180,496 | Austria | Dec. 10, 1954 |